United States Patent
Rietsch (10) Patent No.: US 10,614,230 B2
(45) Date of Patent: Apr. 7, 2020

(54) DIGITAL DATA SECURITY (71) Applicant: Jean-Marc Marie-Joseph Rietsch, Eze (FR)

(72) Inventor: Jean-Marc Marie-Joseph Rietsch, Eze (FR)

(*) Notice: Subject to any disclaimer, the term of this patent is extended or adjusted under 35 U.S.C. 154(b) by 146 days.

(21) Appl. No.: 15/580,618

(22) PCT Filed: Jun. 8, 2016

(86) PCT No.: PCT/IB2016/053357
§ 371 (c)(1),
(2) Date: Dec. 7, 2017

(87) PCT Pub. No.: WO2016/199034
PCT Pub. Date: Dec. 15, 2016

(65) Prior Publication Data
US 2018/0181765 A1 Jun. 28, 2018

(30) Foreign Application Priority Data
Jun. 8, 2015 (FR) .................................... 15 01179

(51) Int. Cl.
*G06F 12/14* (2006.01)
*G06F 21/60* (2013.01)
*G06F 16/11* (2019.01)
*G06F 21/62* (2013.01)
*G06F 21/64* (2013.01)
(Continued)

(52) U.S. Cl.
CPC .......... *G06F 21/602* (2013.01); *G06F 16/113* (2019.01); *G06F 21/6245* (2013.01); *G06F 21/645* (2013.01); *H04L 9/14* (2013.01); *H04L 9/3247* (2013.01); *H04L 63/0428* (2013.01);
(Continued)

(58) Field of Classification Search
None
See application file for complete search history.

(56) References Cited

U.S. PATENT DOCUMENTS

| | | | |
|---|---|---|---|
| 2008/0013724 A1* | 1/2008 | Shamoon | H04L 63/0428 380/201 |
| 2009/0083372 A1* | 3/2009 | Teppler | H04L 9/3226 709/203 |
| 2010/0058476 A1 | 3/2010 | Isoda | |

OTHER PUBLICATIONS

Copeland, "GridFS: The MongoDB Filesystem", 2012, URL: https://web.archive.org/web/20150506020142/http://blog.pythonisito.com/2012/05/gridfs-mongodb-filesystem.html.
(Continued)

*Primary Examiner* — Brandon S Hoffman
(74) *Attorney, Agent, or Firm* — Young & Thompson (57) ABSTRACT Disclosed is a method enabling increasing the security of storing and archiving digital data and adjusting the security level, which level can be selected on the basis of the type and use of the digital data. The method includes restructuring an original file in the form of a plurality of separate, identifiable blocks. Each block includes a field for the binary elements of the data, and a plurality of fields reserved for items of information that each indicate a useful characteristic related to the block, such as the unique identification code. The blocks are transferred to a plurality of dedicated storage sites. Each block corresponds to at least one storage site. A Cartographic Table is set up, containing the Identification Codes of the blocks and associating therewith the number and address(es) of the dedicated storage site(s), and is transferred into the memory of the system and made secure.

15 Claims, 7 Drawing Sheets (51) Int. Cl.
H04L 29/06 (2006.01)
H04L 9/14 (2006.01)
H04L 9/32 (2006.01)
(52) U.S. Cl.
CPC ............ *H04L 63/10* (2013.01); *H04L 63/123* (2013.01); *G06F 2221/2107* (2013.01)

(56) References Cited

OTHER PUBLICATIONS

Ling et al., "InterCloud RAIDer: A Do-It-Yourself Multi-cloud Private Data Backup System", International Conference on Distributed Computing and Networking, Distributed Computing and Networking, Lecture Notes in Computer Science, 2014, pp. 453-468.
Buschman, "mongofile:usage/how/to/use/this.lib", 2014, https://github.com/dbuschman7/mongoFS/blob/master/usage.md.
International Search Report, dated Aug. 17, 2016, from corresponding PCT application No. PCT/IB2016/053357.
French Preliminary Search Report for Application No. FR 1501179, dated Feb. 19, 2016.
French Written Opinion for Application No. FR 1501179, dated Feb. 19, 2016.
International Search Report for Application No. PCT/IB2016/053357, dated Aug. 17, 2016.
Written Opinion of the International Searching Authority for Application No. PCT/IB2016/053357, dated Aug. 17, 2016 (English translation only).

* cited by examiner

DIGITAL DATA SECURITY

The present invention relates to the field of digital data securement when stored or archived.

The invention more particularly relates to a method enabling, on the one hand, digital data storage and archiving securement of any source to be increased and, on the other hand, because of the design itself of said method, the security level which can be selected as a function of the nature and usage of said digital data to be modulated.

Beside known data encryption devices, there are today several digital information data secure storage principles from which can be mentioned:

RAID (Redundant Array of Independent Disks) technologies which consist in storing a file, cut into bits, on different disks according to several cutting and security levels. Thus, different types of RAID storages are known and they are distinguished in particular by the redundancy systems used;

the information storage method, called CAS (Content Addressed Storage) which allows access to data recorded in a storage space using an identification key the preservation of which is necessary to retrieve the data preserved.

In parallel, in the telecommunication field, packet transmission principles are well known which consist in cutting a data file to be transmitted into a plurality of totally independent data packets and reconstituting the entire file when all the packets have reached their destination, for example, the public network TRANSPAC operational since 1978.

But, the assembly of the different concepts from prior art have never been implemented yet.

On the other hand, the methods of prior art require many computing resources and require complex organisation or devices.

Furthermore, they do not offer the possibility to adapt the security level to the nature of the data to be protected.

SUMMARY OF THE INVENTION

It is provided herein a device enabling a digital data file to be exploded into different elements which could be then each stored on distinct spaces, preferably in different and geographically distant physical places. This storage mode relies on the current "cloud" principle. Where the information is stored is not really known but it can be examined and retrieved without difficulty. However, in terms of "cloud", the information is stored fully at a determined place such that their confidentiality is not ensured at all.

The device provided here ensures a strong confidentiality of data insofar as its direct access on storage bays where it is preserved will never enable the completeness of data to be obtained because it will have been cut beforehand into fragments or blocks. On the other hand, this technique is applied regardless of the storage device used which will possibly further enhance data security or not.

Only the one who has access rights could bring back all the fragments consistently.

A first object of the invention is to associate several techniques according to a novel combination, partly known per se, in view of improving the overall digital data storage or archiving securement the binary elements of which are gathered in an origin file, in particular by enabling each of the security criteria which are availability, integrity, confidentiality and traceability of said data to be improved.

Within this scope, a first aspect of the invention relates to identification, authentication of the initiator (physical person or hardware) of a request from a management centre of the method of the invention related to storage or archiving of an initial file F0 of digital data, under conditions ensuring guarantee for its origin or integrity, from the management centre.

A second aspect of the invention relates to processing said initial file F0 of digital data in order to restructure it as a number of independent and identifiable blocks gathered in the file of blocks FB.

A third aspect of the present invention relates to the implementation of distribution of the identified and formatted blocks within a plurality of storage or archiving third-party sites, wherein a site can store several blocks and a block can be present in several sites.

It will be noted that the functional modes and operational parameters of the method of the invention are assigned to each block and are indicated in the specific fields constituting the format of said block.

After reading each block, a transmitter/receiver device transmits data blocks to their dedicated storage sites and, in parallel, the central processor unit (CPU) builds a so-called "mapping table" essentially enabling the single identification code of a block to be associated with the number and addresses of the respective storage sites of said block. The importance of this mapping table is significant insofar as it contains no reference to the binary elements of the data assigned to each block but as, on its own, it enables the entire complete blocks distributed in a plurality of sites to be recovered, which will make up a process prior to any reconstitution of the original file F0.

Consequently, the method of the invention has to implement any appropriate known means to ensure securement of this mapping table.

As an extension of the purpose aiming at enhancing digital data securement, a fourth aspect of the invention relates to the optional encryption of data assigned to different blocks using the application of different encryption modes resorting to algorithms and keys, wherein these modes can vary from block to block.

The knowledge of said modes will of course be necessary upon encrypting data. However, for security purposes, the algorithms and keys used will not be integrated within any field of the block format but, rather, they will be stored in the corresponding mapping table the characteristics of which have already been discussed.

Still for the same purpose, a fifth aspect of the invention relates to the calculation of the fingerprint of each block the result of which will be also stored in the mapping table and will thus possibly enable integrity of data assigned to each block to be checked when coming back from dedicated sites in order to reconstitute the origin file F0.

A second purpose of the invention is to enable the optimum security level SL desired to be implemented to be selected as a function of the nature of the data, its importance in the different fields in question, or even its confidentiality and permanence.

A sixth aspect of the invention describes means which lead to a possible selection of the security level SL. Among these means, the essential element is in the form of a decision table which defines, for different security levels, from the lowest to the highest, the functional modes and values of operational parameters enabling each of the security levels provided in the decision table to be reached.

Said security level SL is selected upon entering the origin file F0 and the decision table is construed and executed by the CPU of the management centre until the corresponding mapping table is obtained.

A seventh aspect of the invention relates to the reconstitution of the initial file F0 using mapping tables preserved in a memory and secured, which do not contain any data to be protected but provide the information necessary to such a reconstitution.

BRIEF DESCRIPTION OF THE DRAWINGS

The invention will be better understood using the detailed description below and the appended figures in which.

DESCRIPTION OF SOME EMBODIMENTS

In the following, the terms store and archive, or storage and archiving will be used indifferently.

Figure 1:
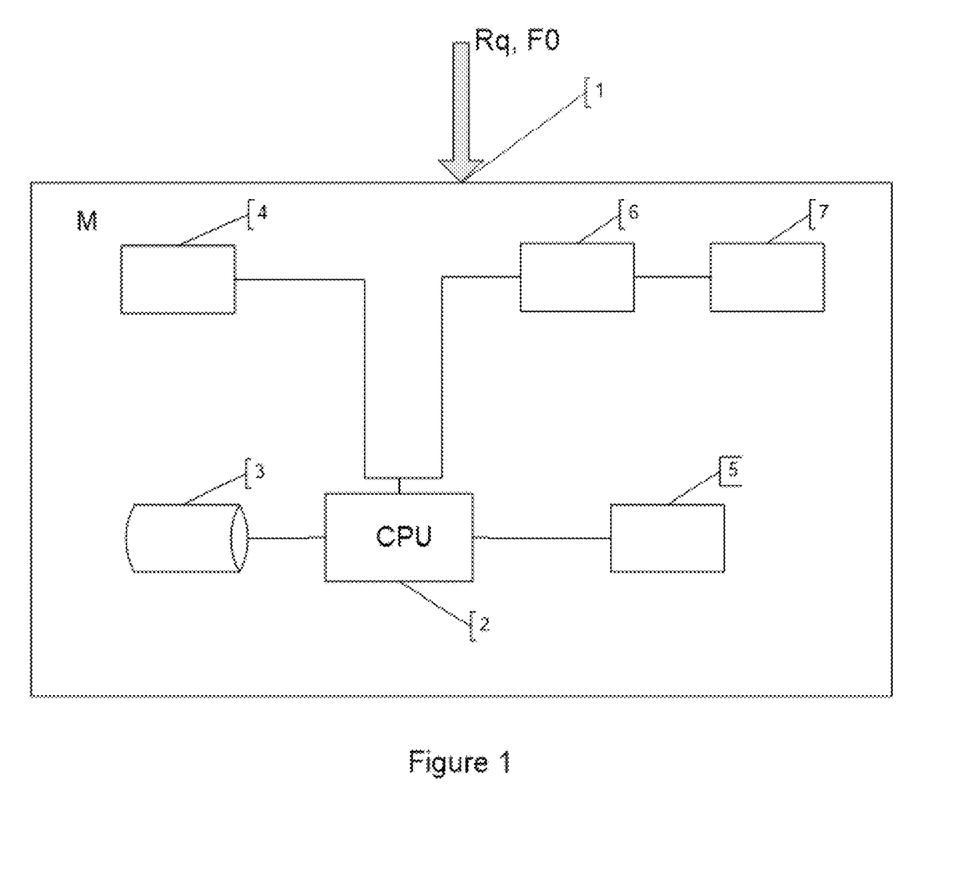
FIG. 1 represents a flowchart of the first phase of the method according to the invention.

FIG. 1 represents the flowchart of the first aspect of the present invention.

A request $R_q$ is addressed by a requestor to the management centre (M) in charge of digital data storage or archiving and, more particularly, to ensure securement of said data having the form of an origin file F0 recorded on any medium.

The management centre (M) 1 has appropriated means:
for identifying and authenticating the requestor, and to bring the evidence of the existence of said data on the date of the request;
to provide origin guarantee and integrity of the file of data that the management centre 1 is committed to store or archive by ensuring to maintain its integrity, confidentiality and permanence.

To do this, a client data base 3 associated with a clock 4 enables the first aforementioned purpose to be achieved, but, for the other guarantees, the central processing unit (CPU) 2, associated with fingerprint calculation means 6 for the file F0 are necessary, which could thus lead to an electronic signature 7, in the case where the signer is a physical person, or to an electronic seal 7 if the signer is an artificial person or a machine.

It is also possible, for example, to calculate said fingerprint and send it to an electronic timestamping service which associates with this fingerprint an order number, a date and a time and seals all of them.

A preferred embodiment of the present invention further contemplates to make electronic signatures by relying on an asymmetric encryption algorithm based on the use of a key pair. The principle consists in, after calculating the fingerprint of the file, encrypting the latter with a private key only controlled by the signer.

When all these precautions have been taken, the digital data of the origin file F0 as well as the fingerprint F(F0) of the file F0 are transferred into the system memory 5 of the management centre 1.

Figure 2:
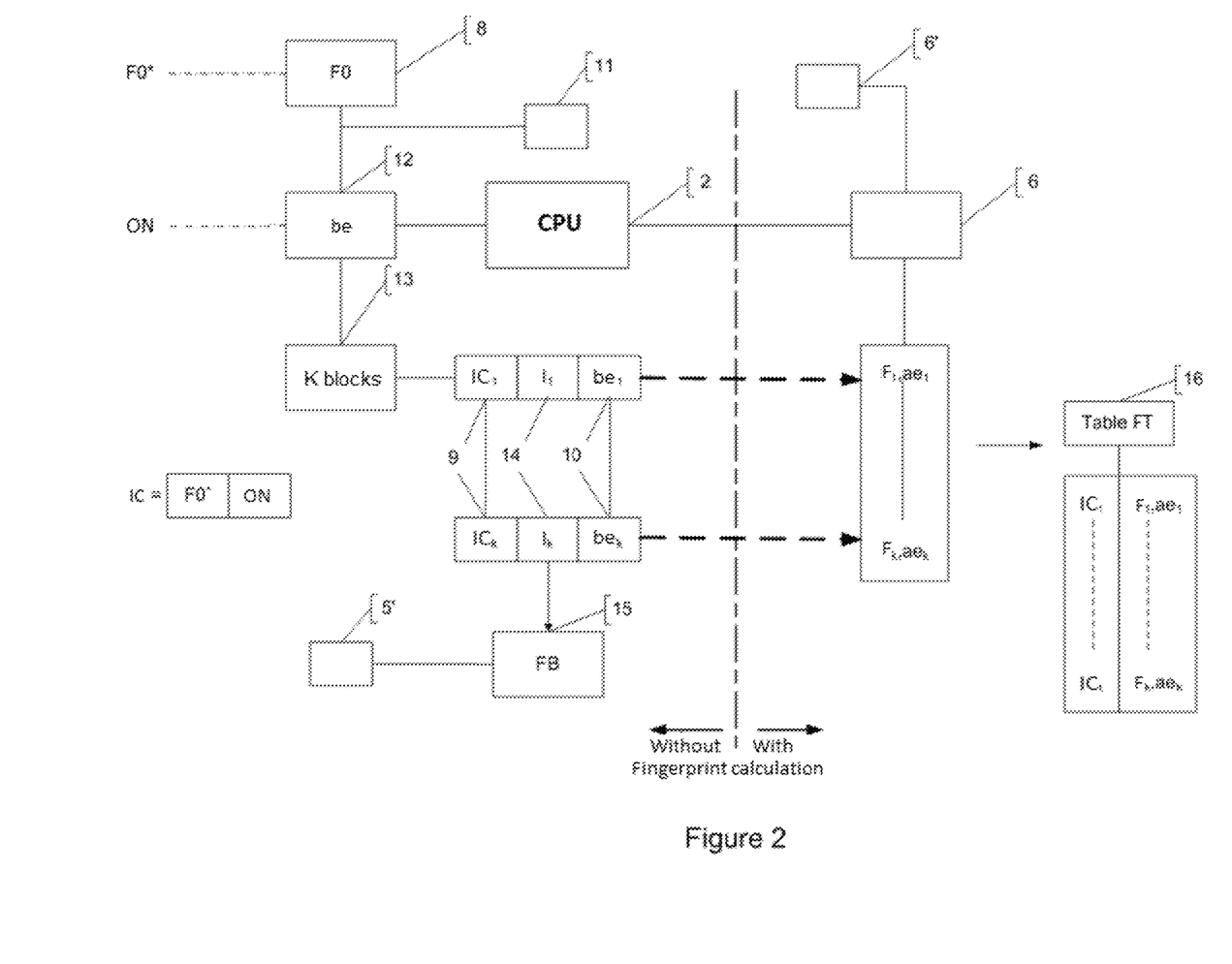
FIG. 2 represents a flowchart of the second phase of the method of the invention completed by the implementation of the optional fingerprint calculation of each block.

The second aspect of the present invention is illustrated by the representation of the flowchart of FIG. 2 relating to one embodiment of the second phase of the method of the invention and intended to restructure the origin file F0 8 as a plurality of independent and identifiable data blocks.

By "block", it is meant a series of binary elements taken, in their initial order, from the digital data of the file F0 8 and having a format of several fields among which:
a first field reserved to the single identification code IC 9 of said block consisting of a label F0* specific to the file F0 and the order number ON definitely assigned to said block when being formed;
a second field, called a data field 10, gathering the binary elements of data assigned to said block;
several other fields intended to operational indicators and the respective contents of which will change during the process, as will be described subsequently.

The blocks are built in such a way that all the binary elements, taken in their initial order, of the data of the origin file F0 satisfies a one-to-one identity relationship with all the binary elements of the data contained in all the blocks successively considered according to their order number ON.

For forming a block, the CPU 2 associated with a counter 11, executing the instructions of a first programming law takes 12, from the file F0 8, a number "l" of binary elements "be" in their initial order to fill the "data" field 10 of the forming block and it simultaneously assigns to it, in the dedicated field, the single identification code IC 9 consisting of the label F0* specific to the file F0 and the order number ON indicative of the position of the binary elements taken in the file F0 8 and assigned to said block "i".

The number "l" represents the block size.

Said first programming law associated with the formation of the blocks 13 defines the first operational parameter that is the total number of blocks "k", given that data confidentiality will be all the better since the number of blocks "k" will be large.

Said first law also determines a second operational parameter by imposing that the size "l" of the blocks is constant for all the blocks (to the closest unit) or is variable from block to block, making the blocks of a variable size contributing, as the increase in the number "k", to the improvement of data confidentiality.

According to one embodiment, the processor of the CPU 2 executing the instructions of the first programming law can use a procedure for counting the binary elements, block by block, such that the size of the blocks is constant and, for example, equal to BE/k=l, where BE represents the number of total binary elements "be" contained in the file F0 8, automatically calculated, for example, upon entering said file F0 8 after examining the initial request $R_q$.

All the blocks will then make appear in the block size field 14, indicative of the block size, a value "l". The last block can possibly be incomplete depending on the value of the ratio BE/k and the size "l'" of this block will be lower than "l".

According to another option, the procedure for counting the binary elements "be" assigned to each of the "k" blocks can be random and the indicators $l_i$ intervening in the respective block size fields 14 will be consequently variable.

If block management problems appear related to the physical size of the entire block, filling characters can be used such that their size becomes equal.

The blocks thus formed and formatted are recorded the one after the other in a file of blocks FB 15 that can be stored in the system memory 5 or, preferably, in an auxiliary cache memory 5' with a quicker access, said file of blocks FB 15 consisting, in a preferred embodiment, of a simple queue, for example, of the FIFO type.

FIG. 2 represents in its left part (without block fingerprint calculation), the content of the blocks 9, 10, 14 of the file of blocks FB 15 at this stage in the method, illustrating the identification code 9 (label of the file FO* and order number ON of the block), the block size indicator $l_i$ and the binary elements $be_i$ assigned to this block.

In a preferred embodiment, illustrated in the right part of FIG. 2 (with block fingerprint calculation), a further block processing intended, in particular to ensure at any time, the integrity of the binary elements "be" assigned to each block, consists in calculating the fingerprint of each block as soon as it is formed by the conventional calculation means 6 having several possible algorithms stored in 6' and, preferably, using two different fingerprint algorithms. The results $F_i$ of the block fingerprint calculations are gathered in a first table called a "fingerprint table" FT 16 essentially consisting of two columns enabling each block identification code $IC_i$ to be associated with the corresponding fingerprint value $F_i$ associated with its calculation algorithm $ae_i$.

Said fingerprint table FT 16 is arranged such that it can be combined without difficulty with other tables, as will be subsequently described. It is also possible to foresee to directly record information from the fingerprint table into the final mapping table. This possibility also exists for the other modes investigated hereinafter.

Figure 3:
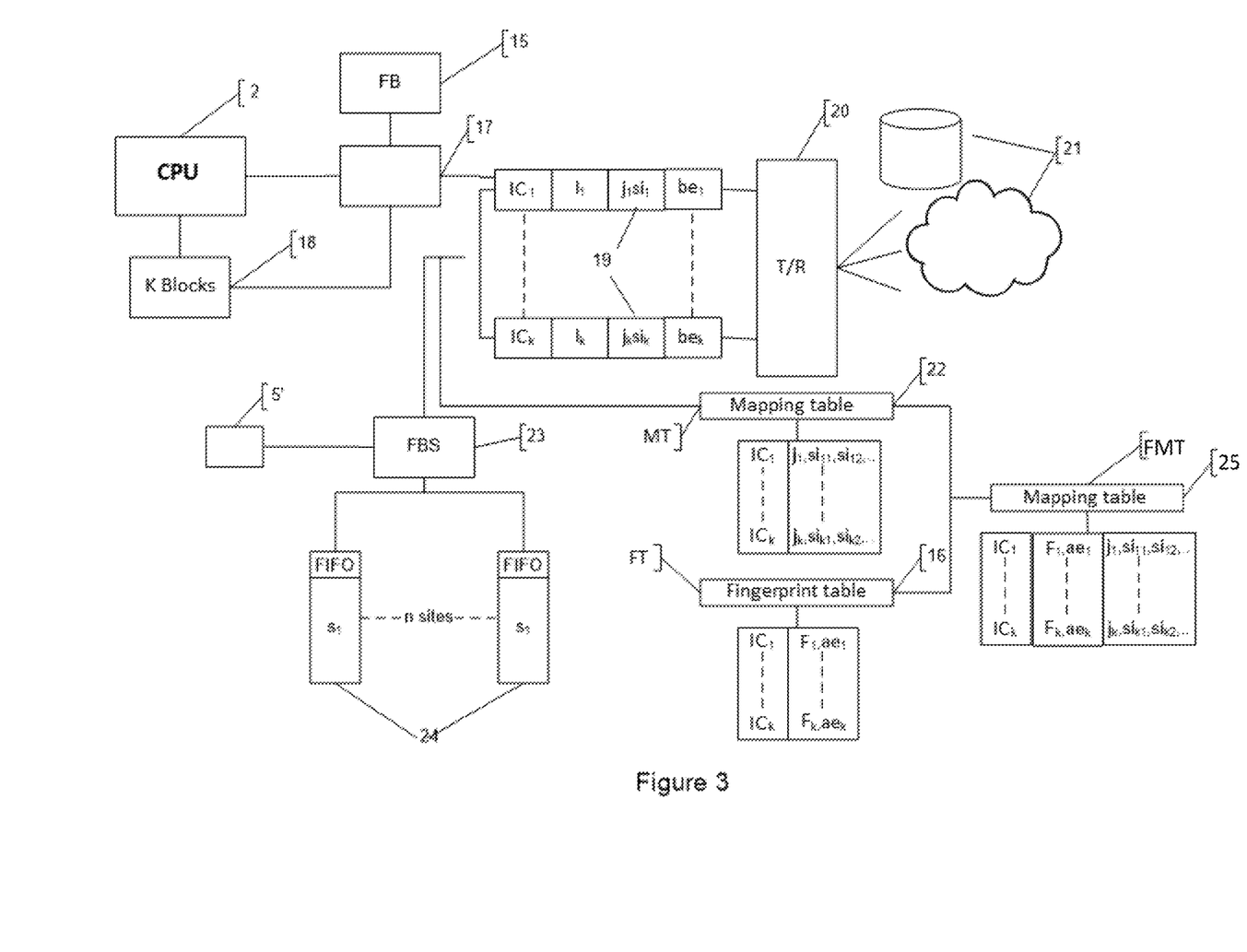
FIG. 3 represents a flowchart of the third phase of the method of the invention.

As soon as the file of blocks FB 15 is full and preserved in the memory 5 or 5', the method activates the instructions of the second programming law implemented according to FIG. 3.

FIG. 3 represents a flowchart of one embodiment of the third aspect of the invention.

This step consists in implementing a second programming law the execution by the processor of the CPU 2 of which includes the following steps of:
  assigning 17 to each of the different blocks of the file of blocks FB 15 one or more address(es) of third-party site(s) available recorded in 18 for storage or archiving, wherein the third-party sites can be local, delocalised or even result from the current "cloud" principle;
  indicating, in parallel, in the appropriate "site" field 19 of the format of each block, the number $j_i$ and the respective addresses $si_k$ of the dedicated sites. The set of blocks thus formatted makes up the new file of blocks FBS 23 preserved, for example, in the memory 5';
  and then transmitting, by conventional and appropriate communication means 20, each block to the dedicated storage site(s) 21.

According to a preferred embodiment, the processor of the CPU 2 extracts the blocks of the file FB 15, block by block, and from a list of addresses of available storage sites 18, it assigns, randomly or in a parameterised way, one or more site(s) to each of the blocks by writing the number $j_i$ and the corresponding address(es) $si_k$ in the "site" field 19 of the block format reserved therefor, and then it transfers the block to the transmitter/receiver device T/R 20 which, after reading the addresses, transmits the block to the dedicated storage site(s) 21.

The multiplicity of said storage sites increases the complexity of gathering the blocks thus disseminated and, consequently, enhances data confidentiality. However, for management reasons, it is possible to moderate the random nature of assigning said sites by setting beforehand a maximum number of sites for a given block and/or for all the blocks.

FIG. 3 also shows that, simultaneously to assigning the sites, the processor of the CPU 2 builds a table which will be designated as the mapping table MT 22. The latter consists of two columns, the first column successively records the identification codes $IC_i$ of all the blocks and the second column indicates the number $j_i$ and the addresses of the storage sites $si_{i1}, si_{i2}, \ldots, si_{ij}$ assigned to each block identified in said first column.

Other embodiments are contemplatable by those skilled in the art. For example, it is possible to establish, from the file of blocks FBS 23, recorded beforehand in the cache memory 5', which gathers all the blocks after assigning the third-party sites, a plurality of queues 24, one by dedicated site, also recorded in the auxiliary cache memory 5', and each gathering a set of blocks intended to the same dedicated site, which enables them to be transferred to the respective sites in a single transmission operation.

After each emission, the transmitter/receiver device 20 of the management centre 1 receives acknowledgements from the different sites. If a possible incident occurs, a new emission of the block(s) in question is performed, as happens conventionally.

However, this procedure also justifies to keep in the memory 5' the file FBS 23, while being likely to be subsequently erased.

Said mapping table MT 22 has a great interest insofar as it contains no trace of the binary elements assigned to each block but as it enables, on its own, the set of complete blocks distributed in a plurality of storage sites to be recovered, which is a process prior to any subsequent reconstitution of the origin file F0 8.

The mapping table MT 22 thus has to be secured by conventional means, for example, by being preserved in the memory 5 and saved on the site of the management centre 1, but it can also be preserved on one or more distant third-party site(s), with the proviso to be encrypted in order to fulfil the confidentiality searched for.

Within the scope of the preferred embodiment which implements the application of the fingerprint calculation 6 of each block and which leads to establishing the fingerprint table FT 16, the latter 16 will be combined with the first type of mapping table MT 22 to result in a second type of final mapping table FMT 25 now consisting of three columns and associating with each block identified by its code $IC_i$, both said result of the corresponding fingerprint calculation and the number $j_i$ and the addresses $si_{i1}, s_{ik}, \ldots$ of the storage sites dedicated to said block.

The mapping table FMT 25 as the mapping table MT 22 require, for the same reasons already mentioned, to be secured according to the same aforementioned means.

With the last acknowledgement from the last site to which the last block has been transmitted, the mapping table MT or the table FMT thus completed is recorded in the system memory 5. This can trigger erasing of the intermediate files FB 15 and FBS 23 and that of the origin file F0 8 and, possibly, that of their respective copies.

Indeed, the mapping table MT or the table FMT associated with the content of all the fields of each block stored or archived in the different third-party sites, provide all the information necessary to reconstitute, at the desired time, the origin file F0 8, which prompts, as has been already suggested, to secure the tables MT and FMT, the only ones able to bring back the blocks distributed between the third-party sites.

Figure 4:
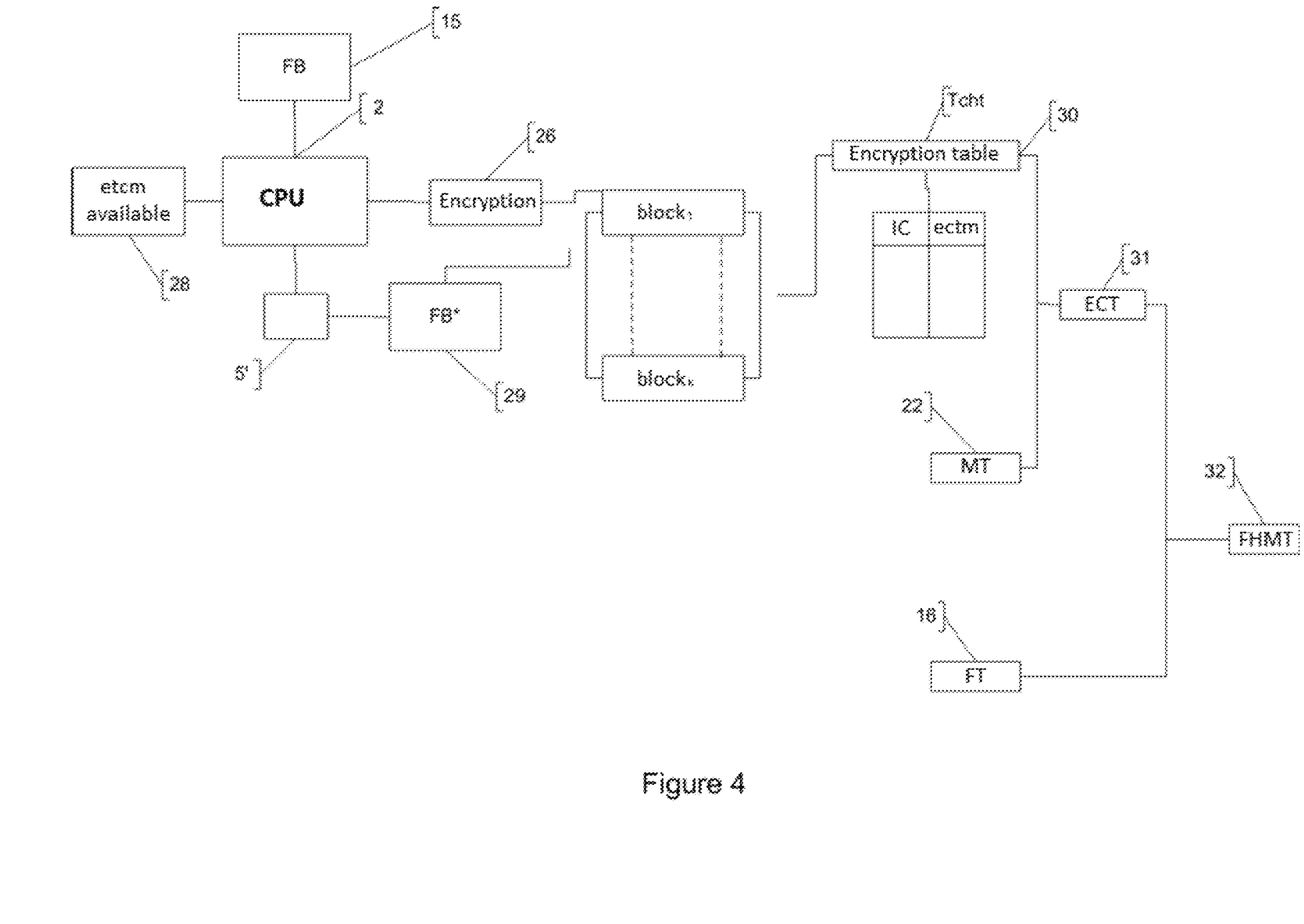
FIG. 4 represents a flowchart of the implementation of the optional encryption process for data assigned to each block.

FIG. 4 represents a flowchart of another preferred embodiment implementing an optional procedure enabling securement of data to be enhanced and, in particular, its confidentiality to be enhanced by involving encryption of said data.

As is indicated in FIG. 4, the application of the encryption process made in 26 occurs, for security reasons, as soon as possible after a block has been formed.

Thus, for example, as soon as the $i^{th}$ block is formed, that is its identification code $IC_i$ is determined as well as its size $l_i$ and the binary elements $be_i$ assigned thereto, the processor of the CPU 2 selects, essentially randomly from several encryption modes (algorithms and keys) (symbolised by "ectm") 28, a mode $ectm_i$, for example, for said first block "i".

It is important to note that, from the encryption mode "ectm" selected in 28, the information necessary to the encryption of said data is also deduced. Consequently, for security reasons, it is essential not to integrate the applied mode "ectm" within the blocks before they are transferred in a plurality of dedicated storage sites.

After said "ectm" mode is applied, the initial data "be" are replaced with the encrypted data "be*" and the block corresponding to these encrypted data joins the new file of encrypted blocks FB* 29 which is stored in the cache memory 5'.

As soon as an encryption mode "ectm" is assigned to a block, simultaneously, the processor of the CPU 2 establishes a table, called an "encryption table" Ectt 30 having two columns, the first column listing the identification codes IC of the blocks and the second column associating with each identification code $IC_i$, the encryption mode $ectm_i$ used for this block.

By combining the encryption table Ectm 30 with the first type of mapping table MT 22 obtained after the blocks are distributed in their respective storage sites, a third type of final mapping table ECT 31 with three columns is established, linking identification codes IC, encryption modes "ectm", numbers "j" and addresses "si" of the dedicated storage sites.

In the same way, if the option of calculating the block fingerprints F is also applied, the fourth type of final mapping table FHMT 32, taking the fingerprint table FT 16 into account, will consist of four columns linking identification codes IC, encryption modes "ectm", fingerprints F, numbers "j" and addresses "si" of the dedicated storage sites.

For identical reasons, the tables ECT and FHMT are secured, as has been previously mentioned.

Figure 5:
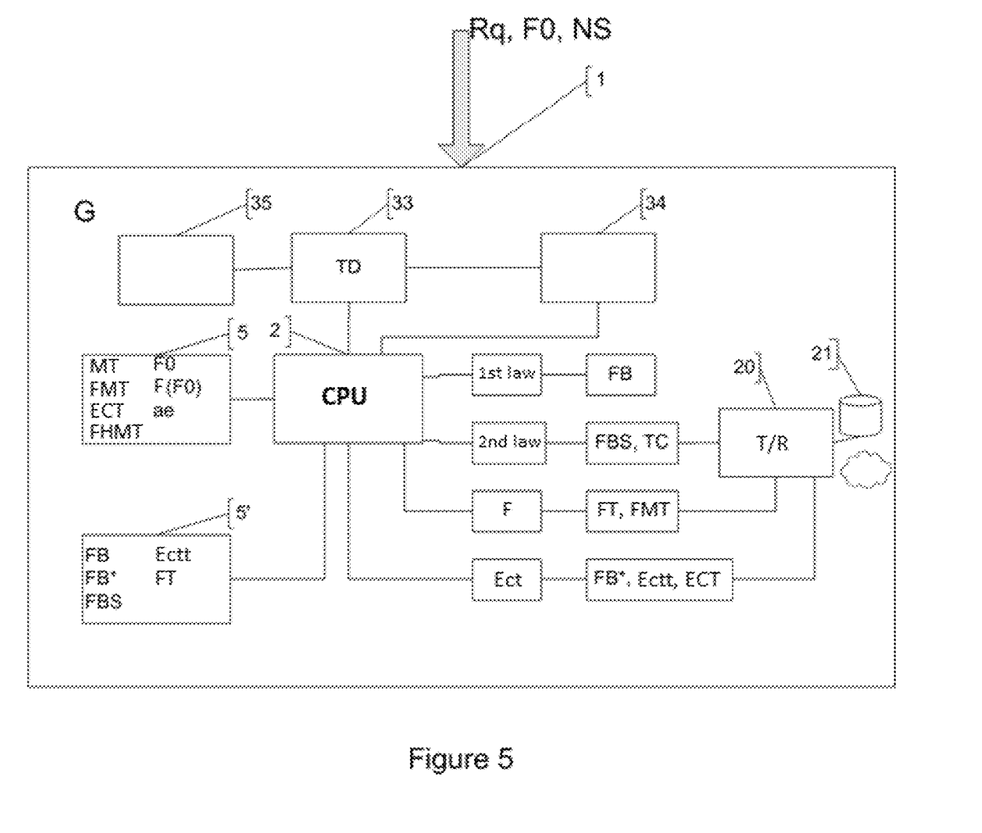
FIG. 5 represents a flowchart of the method of the invention implementing the selection of the security level.

FIG. 5 represents a flowchart of the means used in the previous aspects of the present invention in order to implement them to fulfil requirements of a security level SL selected beforehand.

Depending on the nature, confidentiality, criticality or the like of the data to be stored or archived, the desired security level can vary and an optimum security level is often searched for with respect to the real security need, but also with respect to the processing time, cost and complexity of the securement means involved.

The central element enabling the security level to be modulated consists in establishing beforehand a decision table DT 33 defining the functional modes and the values of operational parameters corresponding to the different selectable security levels SL, in particular upon entering the request $R_q$ for protecting the origin file F0 8.

According to a preferred embodiment, the functional modes and operational parameters selected by the decision table DT 33 as a function of a determined security level SL relate to:
   the number of blocks k, given that the higher k, the more the size e of the blocks will tend to decrease and the better the confidentiality,
   the number of storage sites enabling also the confidentiality to be improved if the number of sites increases,
   the number of copies, that is the number of sites storing a same block, wherein said copies can intervene in case of defects observed relating to the integrity of the blocks,
   performing Yes/No the fingerprint calculation F for each block enabling, if the choice is positive, the integrity of the blocks to be better ensured upon reconstituting the origin file F0,
   performing Yes/No the data encryption enabling, if the choice is positive, the confidentiality of these data to be enhanced.

A look-up table 35 gathers all the functional modes and operational parameters available the multiple combinations of which are likely to determine the different security levels SL.

The decision table DT 33 is implemented by the processor of the CPU 2 after the security level SL is selected.

Once the security level SL is determined, the functional modes and operational parameters corresponding to the choice of the decision table DT 33 are recorded, for example, in an auxiliary cache memory 34 reserved to said parameters for control purposes in case of possible subsequent dysfunction.

The CPU 2 then implements all the previously described processes separately to highlight the different essential steps of the method of the invention by including the different options likely to be taken into account by the decision table 33.

The final mapping tables, regardless of their types, MT, FMT, ECT, FHMT are, as has been already previously described, transferred into the system memory 5 and secured appropriately. It is also possible to only use a single mapping table directly updated as the blocks are constituted.

After the acknowledgement for writing the last block from the last dedicated storage site is returned, and after the securement of said final mapping tables is implemented, in particular after they are recorded in the system memory 5, it is possible to contemplate cancelling the origin file F0 8, with the proviso that its fingerprint F(F0) calculated upon entering the request $R_q$ is preserved in the memory 5, according to an algorithm determined by the management centre 1.

FIGS. 6a, 6b, 6c and 6d represent several schemes and functional flowcharts relating to the fourth phase of the method of the invention the implementation of which results from a request regarding the reconstitution of the origin file F0 8.

To do this, a first step, executed by the CPU 2 (FIG. 6a) is to emit a signal "S" towards all the dedicated storage sites the addresses of which are read in the final mapping table (MT, FMT, ECT, FHMT) 22, 25, 31, 32 preserved in the memory 5 and by any appropriate transmission means.

Figure 6A:
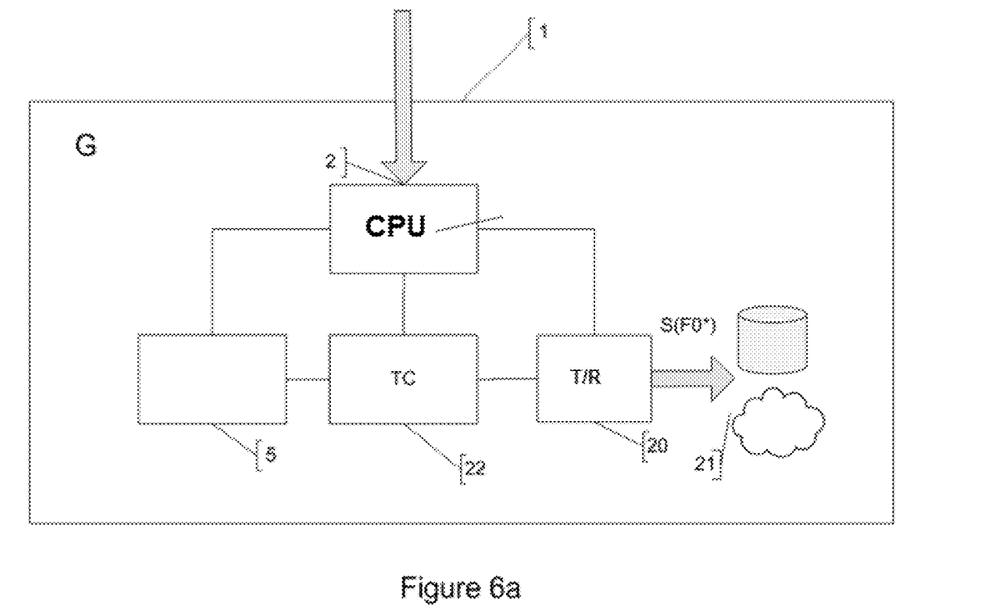
FIGS. 6a, 6b, 6c and 6d represent partial flowcharts of the process for reconstituting the initial file F0.

The signal "S" is designed to indicate that the blocks to be extracted only relate to those which contain in their "identification" (IC) field the flag F0* specific to the origin file F0.

In a second step (FIG. 6b), the reception system 20 gathers all the blocks which come to it from different sites 21 in a file of blocks FR 36.

Figure 6B:
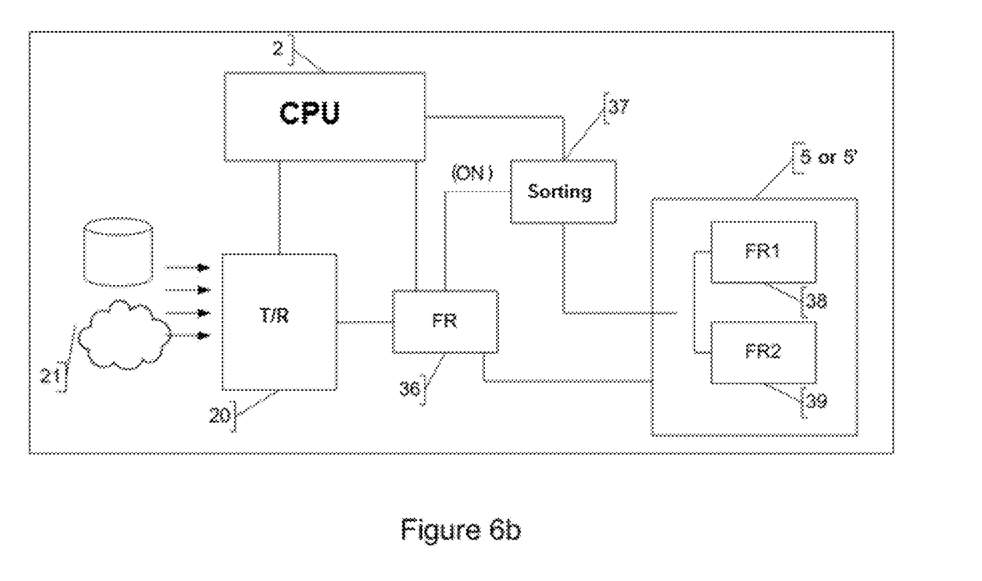

The CPU 2 then implements, on the blocks of the file FR 36, a sorting procedure according to a conventional algorithm the sorting key of which is the order number ON of the block, given that only one block corresponds to an order number ON and this number is found in the identification code IC of the block, to result in establishing both files FR1, 38 and FR2, 39.

The first file FR1 38 contains a set of blocks, which differ from each other by at least their order number ON, the second file FR2 39 gathering all the blocks that have been stored in several dedicated sites and which are in the form at least of replications.

At this stage in the method, a first check for its proper operation consists in observing that the number of blocks of the file FR1 38 is equal to the number "k" of blocks of the origin file F0.

Furthermore, a test relating to the integrity of the data assigned to each block can be performed from the file FR1 38. Thus, FIG. 6c introduces the functional flow chart associated with said integrity test.

Figure 6C:
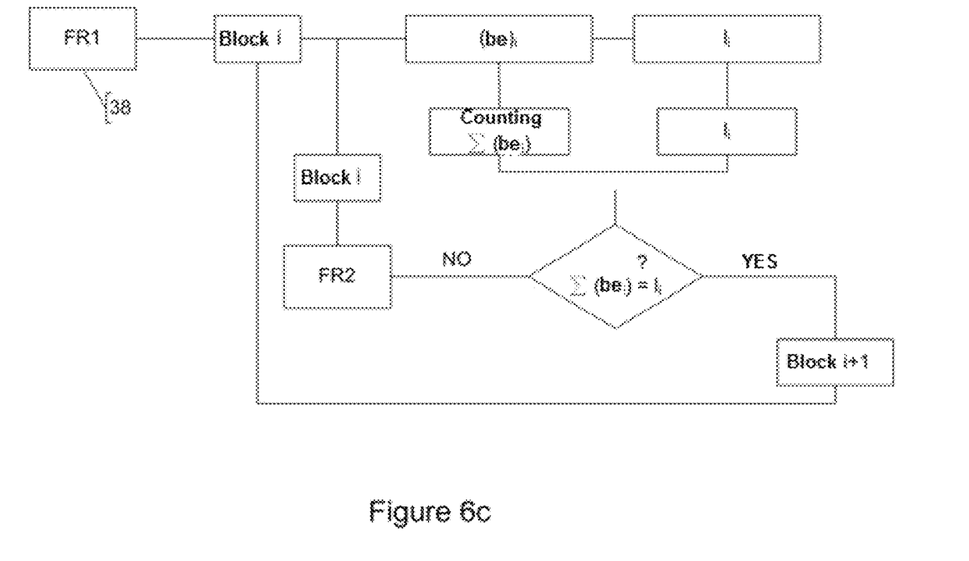

For all the blocks of the file FR1 38, the process is the following one: in block "i", the total number of binary elements $be_i$ in the "data" field is counted and this is compared to the value $l_i$ written in the "block size" field. In case of equality, the process goes on for the next block i+1, otherwise, in case of inequality, it is possible to search whether the block "i" is included in the file FR2 39 and the analogous test cycle is resumed.

This demonstrates another interest in storing a given block in more than one dedicated site in order to ensure integrity of the data assigned thereto.

Another integrity test is possible if the block fingerprint calculation is a selected option. Thus, from the file FR1 38, for each block "i", a fingerprint calculation Fi' is undertaken, using the same algorithm $ae_i$ indicated in the final mapping table FMT 25 or FHMT 32 preserved in the memory 5, which also gives the fingerprint result $F_i$ corresponding to the same block "i" which was present in the origin file F0.

The comparison between the fingerprints Fi' and $F_i$ enables the integrity of data after it is stored to be checked for.

Figure 6D:
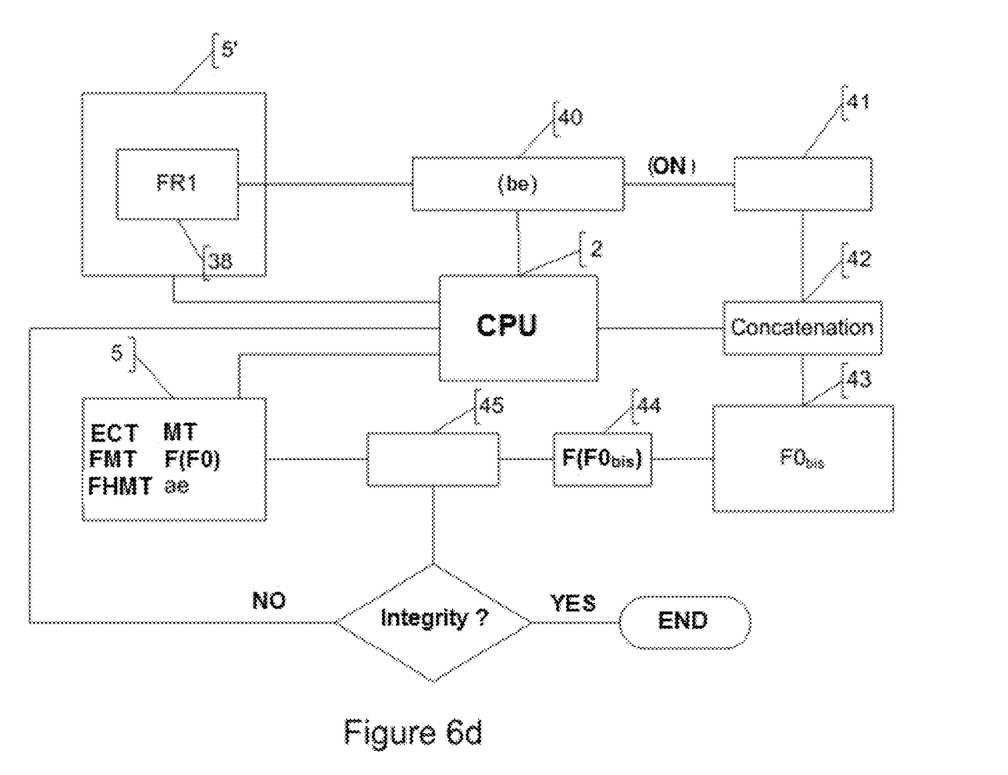

FIG. 6d represents the final step of reconstituting the origin file. According to one embodiment, the CPU 2 takes in 40 the binary elements present in the "data" field of each block of the file FR1 38 and transfers them into a queue 41 according to the same consideration of the order numbers ON as during taking performed in 12 over the course of the second phase of the method of the invention (FIG. 2).

A conventional concatenation operation 42 regarding the records of binary elements of the queue 41 results in the final file $F0_{bis}$ 43 which should be identical to the origin file F0. To check for this statement, it is sufficient to compare in 45 the fingerprint F(F0) of the origin file F0 calculated by the management centre 1 and preserved in the memory 5, with the fingerprint F ($F0_{bis}$) of the reconstituted file $F0_{bis}$ calculated in 44 by the management centre 1 according to the same calculation algorithm.

Upon selecting options in order to better ensure integrity and confidentiality of the data to be stored through the decision table 33 or not, the final mapping tables MT 22, FMT 25, ECT 31 and FHMT 32 decisively intervene in the process for reconstituting the origin file F0.

Indeed, they bring the essential information necessary for said reconstitution, insofar as, not only it enables the storage sites of the different data groups to be located, but also the relationships to be established:

between identification code IC, fingerprint value E and algorithm used "ae", and/or between identification code IC and encryption mode "ectm" the knowledge of which is essential for the subsequent encryption.

It will be also noted that the entirety of the latter information essential to the reconstitution of the origin file F0 does not appear in the blocks.

Consequently, it is important to highlight the fact that said final mapping tables MT 22, FMT 25, ECT 31 and FHMT 32 are preserved in the memory 5 of the management centre 1 and, further, saved as well as secured by any means as has been already mentioned.

Different modifications can be provided to what has been herein described in the embodiments and their implementation of the method of the invention without departing from the scope of the invention.

The invention claimed is:

1. A method for improving digital data securement for storing or archiving purposes, comprising:
    a first phase, consisting in:
        a) identifying and authenticating a request ($R_q$) of a user wishing to protect digital data presented as an origin file (F0),
        b) calculating a fingerprint F(F0) of the file (F0) in order to constitute evidence of an existence of said digital data on a date of said request ($R_q$) and to guarantee an origin and integrity of said digital data via an electronic signature or an electronic seal, and
        c) transferring said digital data and the fingerprint F(F0) of said origin file (F0) in a memory of the system under control of a management centre (G);
    a second phase consisting in:
        d) executing, by a central processing unit (CPU), a first programming to cause the origin file (F0) to be restructured in the form of a plurality of independent and identifiable blocks having a size (l) and a number (k) determined by said first programming, wherein a concatenation of said blocks enables said origin file (F0) to be reconstituted,
        each one of said blocks being structured according to a format having a data field constituted by binary elements (be) of the data assigned to the block, and fields reserved for information each indicating a characteristic related to the block, said information including a single identification code (IC) of the block,
        the set of the blocks making up a file of blocks (FB) recorded in the memory;
    and a third phase consisting in:
        e) applying by the CPU a second programming causing the blocks of the file of blocks (FB) to be transferred to a plurality of storage sites, each block to be transferred to at least one different storage site of said plurality of storage sites, including sub-steps of
        f) inserting into each block a further field that stores a number and addresses of the at least one storage site to which said block is to be transferred, all of the blocks having said further field inserted being gathered in the file of blocks (FBS),
        g) then transferring, in either block by block, or per site, all of the blocks of said file of blocks (FBS) to the storage sites,
        h) then establishing, from said file of blocks (FBS) a final mapping table (MT) comprised of first and second columns, the first column recording the identification codes (IC) of the blocks and the second column associating with each one of said identification code (IC) the number and address of the storage associated with the block, and i) transferring the final mapping table (MT) into the memory of the system.

2. The method according to claim 1, further comprising:
encrypting the digital data contained in the blocks of the file of blocks (FB), thereby transforming the file of blocks (FB) into an encrypted file of blocks (FB*); and
establishing an encryption table (Ectt) that enables matching between each block, by the single identification code (IC) associated therewith, and an encryption mode implemented to encrypt the data of the block,
said encryption table (Ectt) being combinable with said mapping table (MT).

3. The method according to claim 2, further comprising:
storing a fingerprint (F) of each one of the blocks in a fingerprint table (FT) that establishes, for each block, a single link between the single identification code (IC) of the block and the fingerprint (F) of the block,
said fingerprint table (FT) combinable with the encrypted mapping table (Ectt).

4. The method according to claim 3, further comprising:
modulating a security level (SL) for storing or archiving a set of digital data gathered in the origin file (F0),
wherein a decision table (DT) defines combinations of functional modes and operational parameters which result in different security levels (SL), said security level (SL) being selectable upon entering the origin file (F0),
wherein the functional modes and operational parameters defining a security level (SL) relate to:
the number (k) of blocks;
the size (l) of the blocks (fixed/variable);
a total number of the storage sites (j); and
a number of storage sites storing a same block;
and wherein, after selecting a security level (SL), the processor of the CPU transfers the functional modes and operational parameters defined in the decision table (DT) into an auxiliary cache memory connected to the CPU and reserved to the modes and parameters used for obtaining said security level (SL).

5. The method according to claim 3, wherein said fingerprint table (FT) combines with the encrypted mapping table (Ectt) as four columns uniquely associating, for each block, identification code (C), number and addresses of the storage third-party sites (j, si), fingerprint plus algorithm (F, ae), and encryption mode (ectm).

6. The method according to claim 2, further comprising:
modulating a security level (SL) for storing or archiving a set of digital data gathered in the origin file (F0),
wherein a decision table (DT) defines combinations of functional modes and operational parameters which result in different security levels (SL), said security level (SL) being selectable upon entering the origin file (F0),
wherein the functional modes and operational parameters defining a security level (SL) relate to:
the number (k) of blocks;
the size (l) of the blocks (fixed/variable);
a total number of the storage sites (j); and
a number of storage sites storing a same block;
and wherein, after selecting a security level (SL), the processor of the CPU transfers the functional modes and operational parameters defined in the decision table (DT) into an auxiliary cache memory connected to the CPU and reserved to the modes and parameters used for obtaining said security level (SL).

7. The method according to claim 1, further comprising:
storing a fingerprint (F) of each one of the blocks in a fingerprint table (FT) that establishes, for each block, a single link between the single identification code (IC) of the block and the fingerprint (F) of the block,
said fingerprint table (FT) being combinable with the mapping table (MT).

8. The method according to claim 7, further comprising:
modulating a security level (SL) for storing or archiving a set of digital data gathered in the origin file (F0),
wherein a decision table (DT) defines combinations of functional modes and operational parameters which result in different security levels (SL), said security level (SL) being selectable upon entering the origin file (F0),
wherein the functional modes and operational parameters defining a security level (SL) relate to:
the number (k) of blocks;
the size (l) of the blocks (fixed/variable);
a total number of the storage sites (j); and
a number of storage sites storing a same block;
and wherein, after selecting a security level (SL), the processor of the CPU transfers the functional modes and operational parameters defined in the decision table (DT) into an auxiliary cache memory connected to the CPU and reserved to the modes and parameters used for obtaining said security level (SL).

9. The method according to claim 7, wherein said fingerprint table (FT) combines with the mapping table (MT) as three columns uniquely associating, for each block, identification code (IC), number and addresses of the storage third-party sites (j, si), and fingerprint plus algorithm (F, ae).

10. The method according to claim 1, further comprising:
modulating a security level (SL) for storing or archiving a set of digital data gathered in the origin file (F0),
wherein a decision table (DT) defines combinations of functional modes and operational parameters which result in different security levels (SL), said security level (SL) being selectable upon entering the origin file (F0),
wherein the functional modes and operational parameters defining a security level (SL) relate to:
the number (k) of blocks;
the size (l) of the blocks (fixed/variable);
a total number of the storage sites (j); and
a number of storage sites storing a same block;
and wherein, after selecting a security level (SL), the processor of the CPU transfers the functional modes and operational parameters defined in the decision table (DT) into an auxiliary cache memory connected to the CPU and reserved to the modes and parameters used for obtaining said security level (SL).

11. The method according to claim 1, further comprising:
a fourth phase related to reconstitution, upon request, of the origin file (F0) including the following steps of:
j) emitting, from the management centre, to all the storage sites listed in the mapping table (MT), a signal (S) for extracting, from respective storage means of said storage sites, all blocks identified by a flag (F0*) specific to the origin file (F0);
k) receiving all the identified blocks in a received file of blocks (FR) in a cache memory;
l) from the received file (FR), creating a first file (FR1) in which all the identified blocks appear only once, and a second file (FR2) in which only blocks stored in more than one storage site appear;

m) comparing, in the first file (FR1) and for each block $IC_i$, a number of binary elements $be_i$ with a value $l_i$ indicated in a corresponding block size field;

n) extracting the binary elements $be_i$ from all the blocks of the first file (FR1) in an order of order numbers (ON) during an initial formation of the blocks and applying concatenation to reconstitute the first file as an output file ($F0_{bis}$); and o) comparing the fingerprint F(F0) of the origin file (F0) in the memory of the management centre with a new fingerprint $F(F0_{bis})$ of the output file ($F0_{bis}$).

12. The method according to claim 11, further comprising:

encrypting the digital data contained in the blocks of the file of blocks (FB), thereby transforming the file of blocks (FB) into an encrypted file of blocks (FB*); and establishing an encryption table (Ectt) that enables matching between each block, by the single identification code (IC) associated therewith, and an encryption mode implemented to encrypt the data of the block, said encryption table (Ectt) combinable with said mapping table (MT) indicating, for each block, a single matching between identification code (IC), number "j" and addresses of the third-party storage sites "si", and encryption mode "ectm".

13. The method according to claim 11, further comprising:

storing a fingerprint (F) of each one of the blocks in a fingerprint table (FT) that establishes, for each block, a single link between the single identification code (IC) of the block and the fingerprint (F) of the block, said fingerprint table (FT) combinable with the mapping table (MT).

14. The method according to claim 13, further comprising:

modulating a security level (SL) for storing or archiving a set of digital data gathered in the origin file (F0), wherein a decision table (DT) defines combinations of functional modes and operational parameters which result in different security levels (SL), said security level (SL) selected upon entering the origin file (F0), wherein the functional modes and operational parameters defining a security level (SL) relate to:

the number (k) of blocks;

the size (l) of the blocks (fixed/variable);

a total number of dedicated sites (j); and a number of sites storing a same block;

and wherein, after selecting a security level (SL), the processor of the CPU transfers the functional modes and operational parameters defined in the decision table (DT) into an auxiliary cache memory connected to the CPU and reserved to the modes and parameters used for obtaining said security level (SL);

and further comprising:

encrypting the digital data contained in the blocks of the file of blocks (FB) thereby transforming the file of blocks (FB) into an encrypted file of blocks (FB*); and establishing an encryption table (Ectt) that enables matching between each block, by the single identification code (IC) associated therewith, and an encryption mode implemented to encrypt the data of the block, said encryption table (Ectt) combinable with said mapping table (MT).

15. The method of claim 1, wherein the characteristic related to the block is the single identification code.

* * * * *